United States Patent [19]
Jones

[11] Patent Number: 5,975,756
[45] Date of Patent: Nov. 2, 1999

[54] HEATER WIRE TEMPERATURE MEASURING COPPER SHIELD

[75] Inventor: Thaddeus M. Jones, Bremen, Ind.

[73] Assignee: MSX, Inc., South Bend, Ind.

[21] Appl. No.: 08/988,889

[22] Filed: Dec. 11, 1997

[51] Int. Cl.$^6$ .............................. G01K 1/08; G01K 7/00; H05B 3/00; H05B 3/44
[52] U.S. Cl. ........................ 374/141; 374/183; 29/611; 219/544; 338/24; 338/227
[58] Field of Search .................................... 374/141, 152, 374/183; 29/611, 613; 219/544, 546, 548; 338/22 R, 23, 24, 226, 227

[56] References Cited

U.S. PATENT DOCUMENTS

| | | | |
|---|---|---|---|
| 1,862,014 | 6/1932 | Grondahl . | |
| 2,470,653 | 5/1949 | Schulman et al. | 201/63 |
| 3,204,462 | 9/1965 | Horne | 73/359 |
| 3,295,087 | 12/1966 | Landis et al. | 338/28 |
| 5,221,916 | 6/1993 | McQueen | 338/24 |
| 5,885,410 | 3/1999 | Berkan | 156/582 |

FOREIGN PATENT DOCUMENTS

| | | |
|---|---|---|
| 1 080 682 | 2/1957 | Germany . |
| 197 394 | 12/1958 | Sweden . |

*Primary Examiner*—Vit Miska
*Attorney, Agent, or Firm*—Taylor & Associates, P.C.

[57] ABSTRACT

A method of measuring the temperature of a wire which is surrounded by a layer of insulation includes the step of wrapping the layer of insulation with an electrically and thermally conductive ground shield having two opposing longitudinal ends, one of the ends being electrically grounded. A first relationship is determined between the temperature of the wire and a temperature of the shield. A second relationship is ascertained between an electrical resistance of the shield between the longitudinal ends and the temperature of the shield. The electrical resistance of the shield between the longitudinal ends is measured. The temperature of the wire is established by using the first relationship and the second relationship to correlate the measured electrical resistance of the shield to the temperature of the wire.

13 Claims, 1 Drawing Sheet

HEATER WIRE TEMPERATURE MEASURING COPPER SHIELD

BACKGROUND OF THE INVENTION

1. Field of the Invention

The present invention relates to embedded heater wires, and more particularly, shielded, embedded heater wires.

2. Description of the Related Art

An embedded heater wire is generally an insulated, electrically conductive heater wire which is embedded into and just below a surface such as a door, wall or floor which is to be heated thereby. A shield consisting of a number of very fine copper wires is usually woven around the insulation which surrounds the heater wire. The grounded shield is a safety device which protects the external apparatus from the heater wire in the result of a failure of the insulation. The shield can be connected to a ground-fault interrupter which, when sensing leakage current within the shield originating from the heater wire, switches off power to the heater wire. It is desirable to measure the temperature of the heater wire and/or the heated substrate while in operation in order to monitor the heater's performance and to guard against fire hazards.

It is known to measure the temperature of a heater wire by directly contacting the heater wire with a temperature probe somewhere along its length. A problem is that the heater wire is embedded while in use and it is sometimes necessary to compromise the integrity of either the heated surface or the insulation surrounding the heater wire in order to insert a temperature probe against the heater wire. Another problem is that such heater wires typically carry high current during operation, and any exposure of the heater wire creates a shock hazard.

It is also known to measure the temperature of the surface being heated by embedding temperature sensors therein and/or placing temperature sensors thereon. A problem is that embedded sensors structurally weaken the heated substrate. Sensors placed upon the surface may be unaesthetic or damaged by foot traffic. Another problem is that wires must be extended from the sensors to a central electrical processor. The sensors and associated wires also represent an additional expense.

What is needed in the art is a heater wire apparatus in which the temperature of the heater wire and/or heated substrate can be determined without exposing or making direct contact with the heater wire itself and without the need for additional temperature sensors.

SUMMARY OF THE INVENTION

The present invention provides a heater wire surrounded by a layer of insulation and a grounded shield. The temperature of the heater wire and/or heated substrate is determined by measuring the temperature of the surrounding shield.

The invention comprises, in one form thereof, a method of measuring the temperature of a wire which is surrounded by a layer of insulation. The layer of insulation is wrapped with an electrically and thermally conductive ground shield having two opposing longitudinal ends, one of the ends being electrically grounded. A first relationship is determined between the temperature of the wire and a temperature of the shield. A second relationship is ascertained between an electrical resistance of the shield between the longitudinal ends and the temperature of the shield. The electrical resistance of the shield between the longitudinal ends is measured. The temperature of the wire is established by using the first relationship and the second relationship to correlate the measured electrical resistance of the shield to the temperature of the wire.

An advantage of the present invention is that the temperature of the heater wire can be determined without exposing the heater wire or making any direct contact with the heater wire.

Another advantage is that the integrity of the insulation surrounding the heater wire and of the surface in which the heater wire is embedded is not compromised.

Yet another advantage is that temperature sensors attached to the heater wire and/or surrounding substrate, and associated wires, are not required to measure temperature.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
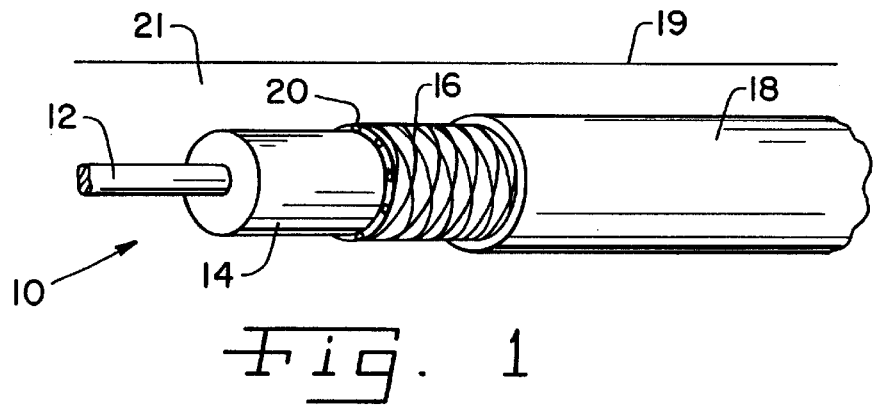
FIG. 1 is a sectional, perspective view of one embodiment a heater cable of the present invention.

Referring now to the drawings, and more particularly to FIG. 1, there is shown one embodiment of a heater cable 10 of the present invention including a resistance wire 12 surrounded by a layer of insulation 14. A copper shield 16 is woven around insulation 14 and is surrounded by an outer jacket 18. Cable 10 is embedded below a surface 19 of a substrate 21, such as a door, wall or floor, which is to be heated thereby.

Centrally located resistance wire 12 is formed of a resistance wire alloy and is used for creating heat when current is passed through it. Layer of insulation 14 is a layer of extruded plastic which is electrically insulating but may or may not be thermally conductive. Layer of insulation 14 also serves to substantially seal resistance wire 12 for purposes of corrosion resistance.

Figure 2:
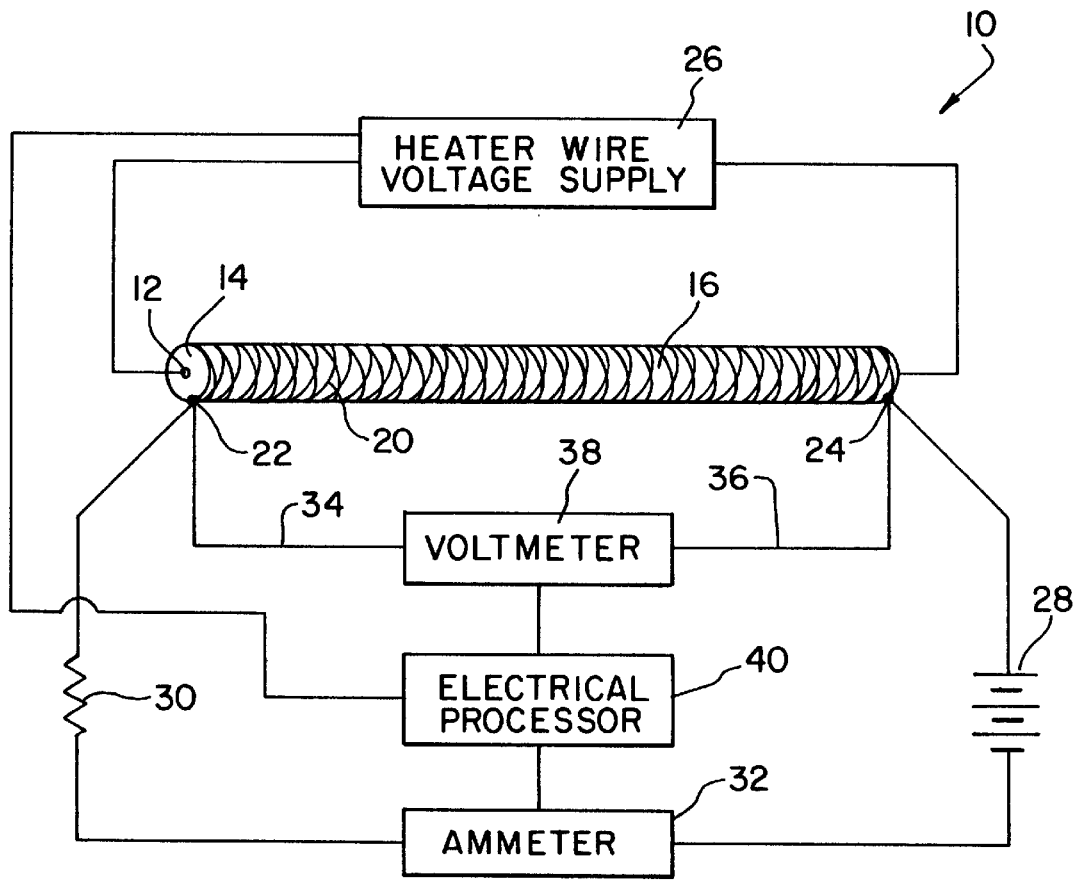
FIG. 2 is a schematic view of the heater cable of FIG. 1 with a temperature measuring copper shield and associated electrical circuitry.

Shield 16 is formed of a mesh of interwoven fine copper wires 20 which are wrapped around insulation layer 14. In the embodiment shown, copper wires 20 have cross-sectional areas which, when added together, would be equivalent to the cross-sectional area of a no. 18 American Wire Gauge wire. It has been found that this cumulative cross-sectional area provides a level of electrical resistance within shield 16 that is acceptable for the purposes of this invention. Of course, copper wires 20 of shield 16 may have a different equivalent cross-sectional area, depending upon the particular application. Shield 16 includes two opposing longitudinal ends 22 and 24 (FIG. 2), with end 22 being grounded as shown.

Outer jacket 18 can be formed of virtually any material, such as extruded plastic or glass-filled polytetrafluoroethylene. Outer jacket 18 substantially seals shield 16 and thereby prevents the corrosion of shield 16.

During use, heater cable 10 is embedded below surface 19 of a substrate 21. A heater wire voltage supply 26 is connected across opposite ends of resistance wire 12, passing current therethrough. Power is dissipated within resistance wire 12, creating heat which is then absorbed by the surrounding embedded surface. In steady state, the temperature of shield 16 is a function of the temperature of resistance wire 12, the temperature of the surrounding substrate, the thickness and thermal conductivity of insulation 14, and the thickness and thermal conductivity of outer jacket 18. The temperature of the surrounding substrate, in turn, is a function of the ambient temperature, among other factors. The thicknesses and thermal conductivities of insulation 14 and of outer jacket 18 can be predetermined. The temperature of the ambient air can be measured with a temperature sensor (not shown). Before steady state has been reached, the temperature of shield 16 is also a function of the voltage applied to heater wire 12 and the length of time the voltage has been applied. Through experimentation, a relationship can be determined between the temperature of shield 16 and the temperature of resistance wire 12 at a given ambient temperature. This relationship can be stored in memory as a look-up table or in software as a formula having perhaps other variables, such as the level and duration of voltage applied to heater wire 12. Another relationship of this first type can be determined through experimentation between the temperature of shield 16 and the temperature of surrounding substrate 21 at a given ambient temperature. Before steady state, the level and duration of voltage applied to heater wire 12 may also be factors to be included in the relationship between the temperature of shield 16 and substrate 21. This relationship can also be stored in memory as a look-up table or in software as a formula having perhaps other variables, such as the wind speed to which surface 19 is exposed.

The electrical resistance of copper is a function of its temperature. Thus, a relationship between the temperature of shield 16 and its electrical resistance between longitudinal ends 22 and 24 can be ascertained through further experimentation. This relationship of a second type can also be stored as a look-up table or as a formula. Combining a relationship of the first type and a relationship of the second type, a third type of relationship can be determined between the electrical resistance of shield 16 between ends 22 and 24 and either the temperature of resistance wire 12 or the temperature of the surrounding substrate. This third relationship can also be stored as a look-up table or as a formula. In order to determine the electrical resistance of shield 16, a current source, such as a battery 28, is used to pass current between ends 22 and 24 of shield 16. A current limiting device, such as resistor 30, is used to keep the current passing through shield 16 at a safe level. An ammeter 32 is connected in series combination with resistor 30 and battery 28 in order to measure the current passing through shield 16. Leads 34 and 36 of a voltmeter 38 are electrically connected to longitudinal ends 22 and 24, respectively, of shield 16 in order to measure a voltage drop therebetween. The voltage measured by voltmeter 38 at any particular instant can be divided by the current measured by ammeter 32 at that same instant to arrive at a resistance of shield 16 between ends 22 and 24. Once this resistance of shield 16 has been established, an electrical processor 40 can use look-up tables and/or formulas associated with the first and second relationships in order to determine the temperature of resistance wire 12 and/or substrate 21. In another embodiment (not shown), lead 34 of voltmeter 38 is not connected to grounded longitudinal end 22. Rather, lead 34 is grounded at another location.

Depending upon the application in which heater cable 10 is employed, numerous variables which are not mentioned herein may affect the relationships between the temperature of shield 16 and the temperatures of heater wire 12 and substrate 21. The most influential of these variables can only be determined through experimentation with the particular application. Further, these variables should be factored into the look-up tables or included in the software formulas.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of measuring the temperature of a wire which is surrounded by a layer of insulation, said method comprising the steps of:

wrapping the layer of insulation with an electrically and thermally conductive ground shield having two opposing longitudinal ends, one of said ends being electrically grounded;

determining a first relationship between the temperature of the wire and a temperature of said shield;

ascertaining a second relationship between an electrical resistance of said shield between said longitudinal ends and said temperature of said shield;

measuring said electrical resistance of said shield between said longitudinal ends; and establishing the temperature of the wire by using said first relationship and said second relationship to correlate said measured electrical resistance of said shield to the temperature of the wire.

2. The method of claim 1, wherein said measuring step comprises the additional steps of:

running a known electrical current between said longitudinal ends of said shield;

measuring a voltage between said longitudinal ends of said shield; and calculating said electrical resistance of said shield between said longitudinal ends by dividing said measured voltage by said known current.

3. The method of claim 2, wherein said running step comprises the additional steps of:

connecting a current source, an ammeter, and a means for limiting current in series to form a series combination;

connecting said series combination across said longitudinal ends of said shield; and measuring a current between said longitudinal ends of said shield by using said ammeter.

4. A method of measuring the temperature of a substrate heated by a wire embedded within the substrate, the wire being surrounded by a layer of insulation, said method comprising the steps of:

wrapping the layer of insulation with an electrically and thermally conductive ground shield having two opposing longitudinal ends, one of said ends being electrically grounded;

determining a first relationship between the temperature of the substrate and a temperature of said shield;

ascertaining a second relationship between an electrical resistance of said shield between said longitudinal ends and said temperature of said shield;

measuring said electrical resistance of said shield between said longitudinal ends; and establishing the temperature of the substrate by using said first relationship and said second relationship to correlate said measured electrical resistance of said shield to the temperature of the substrate.

5. A method of measuring the temperatures of a substrate and of a wire embedded within the substrate, the wire heating the substrate and being surrounded by a layer of insulation, said method comprising the steps of:

wrapping the layer of insulation with an electrically and thermally conductive ground shield having two opposing longitudinal ends, one of said ends being electrically grounded;

determining two first relationships, one first relationship being between the temperature of the substrate and a temperature of said shield, an other first relationship being between the temperature of the wire and said temperature of said shield;

ascertaining a second relationship between an electrical resistance of said shield between said longitudinal ends and said temperature of said shield;

measuring said electrical resistance of said shield between said longitudinal ends; and establishing the temperatures of the substrate and of the wire by using said two first relationships and said second relationship to correlate said measured electrical resistance of said shield to the temperature of the substrate and to the temperature of the wire.

6. An embedded heater wire apparatus, comprising:

a substrate;

a heater cable substantially embedded within said substrate, said heater cable including a heater wire surrounded by a layer of insulation, said layer of insulation being surrounded by an electrically and thermally conductive ground shield having two exposed longitudinal ends, one of said ends being electrically grounded, said shield being substantially surrounded by an outer jacket; and means for determining temperatures of said substrate and of said wire, said determining means using said shield.

7. The heater wire apparatus of claim 6, wherein said determining means comprises means for ascertaining a temperature of said shield and means for relating said temperature of said shield to said temperatures of said substrate and of said wire.

8. The heater wire apparatus of claim 7, wherein said relating means comprises an electrical processor.

9. The heater wire apparatus of claim 7, wherein said ascertaining means comprises means for measuring an electrical resistance of said shield between said longitudinal ends and means for correlating said electrical resistance of said shield to said temperature of said shield.

10. The heater wire apparatus of claim 9, wherein said measuring means comprises a voltage source and an ammeter electrically connected in series across said longitudinal ends of said shield.

11. The heater wire apparatus of claim 9, wherein said correlating means comprises an electrical processor.

12. The heater wire apparatus of claim 6, wherein said shield comprises a mesh of interwoven copper wires.

13. The heater wire apparatus of claim 12, wherein said copper wires have a cumulative cross-sectional area substantially equal to a cross-sectional area of an 18 gauge wire.

* * * * *

UNITED STATES PATENT AND TRADEMARK OFFICE
CERTIFICATE OF CORRECTION

PATENT NO. : 5,975,756
DATED : November 2, 1999
INVENTOR(S) : Thaddeus M. Jones

It is certified that error appears in the above-identified patent and that said Letters Patent is hereby corrected as shown below:

On the Title Page:

Section [54], after WIRE, insert --WITH--.

COLUMN 1

Line 1, after WIRE, insert --WITH--.

Signed and Sealed this

Third Day of April, 2001

Attest:

NICHOLAS P. GODICI

Attesting Officer     Acting Director of the United States Patent and Trademark Office